(12) United States Patent
Izumi

(10) Patent No.: US 9,491,330 B2
(45) Date of Patent: Nov. 8, 2016

(54) MOBILE TERMINAL CAPABLE OF REDUCING BATTERY EXHAUSTION RISK AND CONTROL METHOD THEREOF

(71) Applicant: KYOCERA Document Solutions Inc., Osaka (JP)

(72) Inventor: Tomoyuki Izumi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/979,466

(22) Filed: Dec. 27, 2015

(65) Prior Publication Data

US 2016/0191751 A1 Jun. 30, 2016

(30) Foreign Application Priority Data

Dec. 25, 2014 (JP) ................................. 2014-262364

(51) Int. Cl.
*H04N 1/00* (2006.01)
*H04N 1/60* (2006.01)
*G06F 3/12* (2006.01)

(52) U.S. Cl.
CPC .............. *H04N 1/6083* (2013.01); *G06F 3/12* (2013.01); *H04N 1/00307* (2013.01); *H04N 2201/0094* (2013.01); *H04N 2201/33378* (2013.01)

(58) Field of Classification Search
None
See application file for complete search history.

(56) References Cited

U.S. PATENT DOCUMENTS

| 6,947,181 B1* | 9/2005 | Sato .................... H04N 1/00204 358/1.15 |
| 7,407,108 B1* | 8/2008 | Euler ........................ G06F 1/32 235/472.01 |
| 9,113,017 B2* | 8/2015 | Ishikawa ............ H04N 1/00204 |
| 2005/0024651 A1* | 2/2005 | Yu .......................... H04N 19/86 358/1.9 |

FOREIGN PATENT DOCUMENTS

| JP | 2002-351632 A | 12/2002 |
| JP | 2004-021905 A | 1/2004 |
| JP | 2007-106037 A | 4/2007 |
| JP | 2008-288906 A | 11/2008 |
| JP | 2010-277466 A | 12/2010 |

OTHER PUBLICATIONS

Machine translation of Japanese Pub. No. 2004021905 to Yokota et al., Jan. 2004.*

* cited by examiner

*Primary Examiner* — Paul F Payer
(74) *Attorney, Agent, or Firm* — Hawaii Patent Services; Nathaniel K. Fedde; Kenton N. Fedde

(57) ABSTRACT

Provided is a mobile terminal including a battery residual quantity detecting part that is configured to detect a battery residual quantity of the battery, and a remote control operation processing part that is configured to cause the data conversion part to create monochrome print data by converting the color print data into the monochrome data when it is determined that transmission of the color print data cannot successfully be completed based on the battery residual quantity detected by the battery residual quantity detecting part and data volume of the color print data, and to transmit the created monochrome print data to the image forming apparatus.

6 Claims, 6 Drawing Sheets

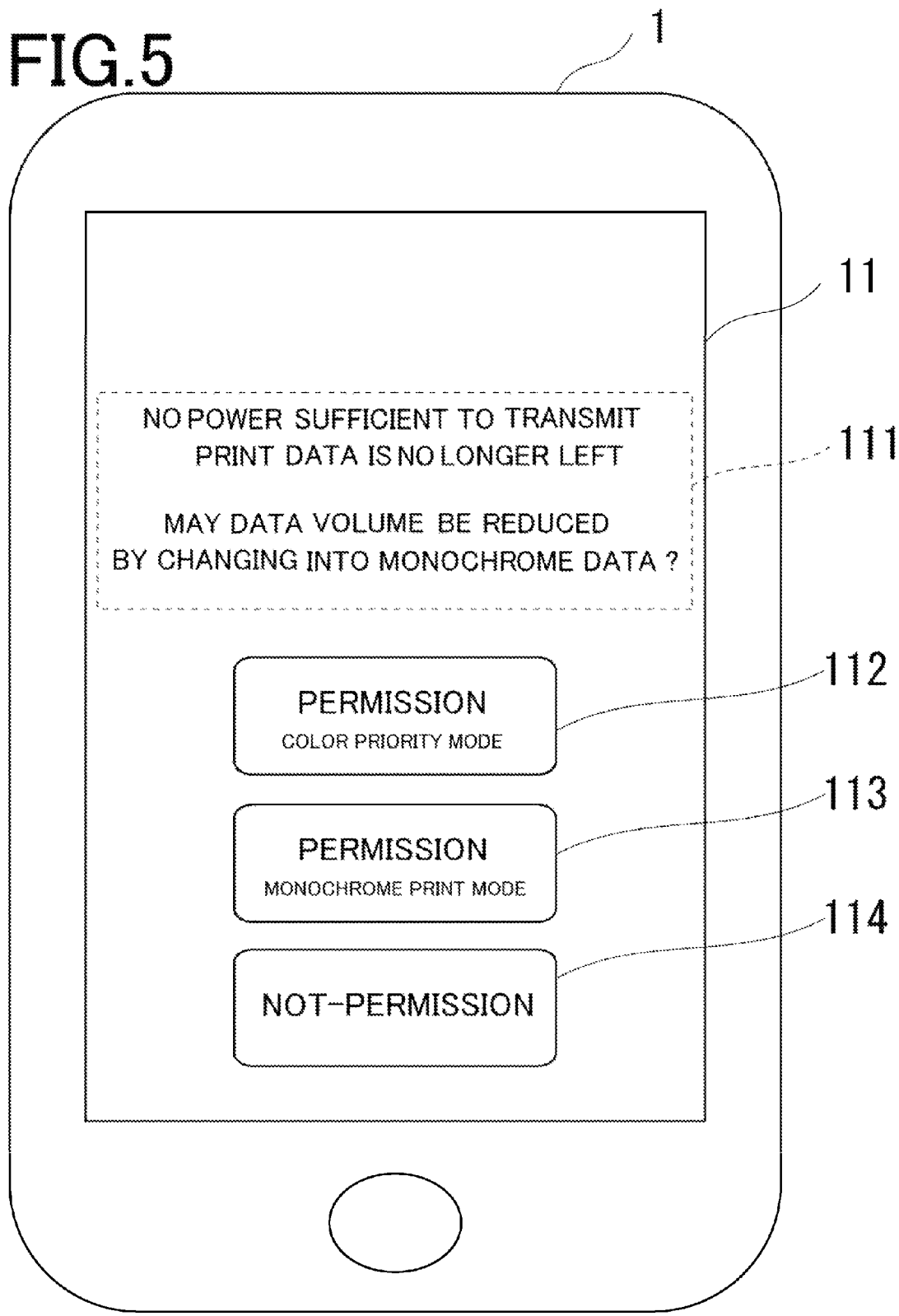

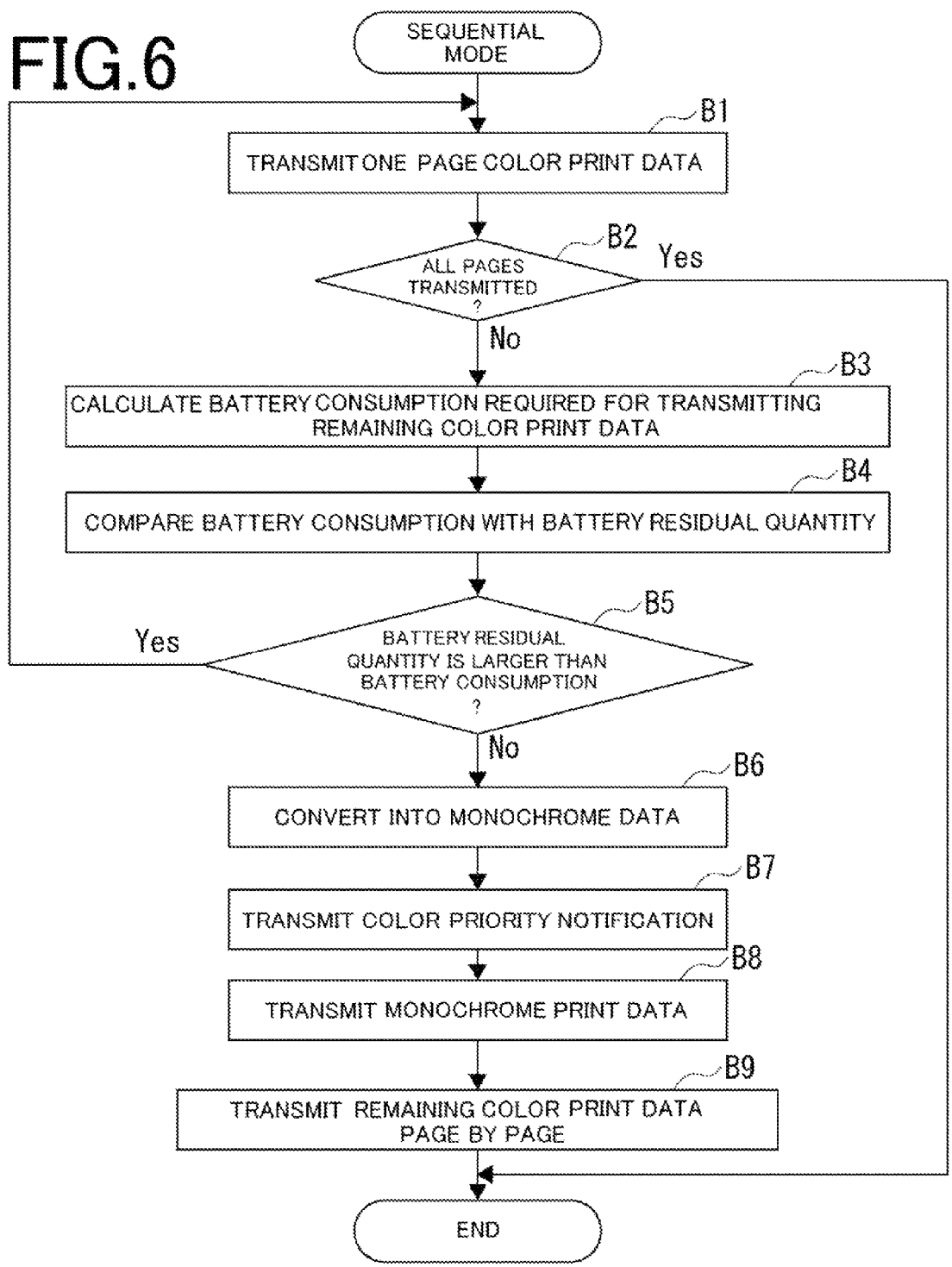

MOBILE TERMINAL CAPABLE OF REDUCING BATTERY EXHAUSTION RISK AND CONTROL METHOD THEREOF

INCORPORATION BY REFERENCE

This application is based on and claims the benefit of priority from Japanese Patent Application No. 2014-262364 filed on Dec. 25, 2014, the entire contents of which are hereby incorporated by reference.

BACKGROUND

The present disclosure relates to a mobile terminal capable of controlling an image forming apparatus and a control method thereof.

Recently, it has been known a technology in which an image forming apparatus such as a printer, a copying machine, or an MFP (Multifunction Peripheral/Printer/Product) is configured to operate by using a terminal device, for example, a smart phone or a tablet terminal. A user gives printing instructions on an operation screen displayed on the mobile terminal by designating a document (document data or image data) accumulated in the mobile terminal. Thus, the designated documents transmitted, as print data, from the mobile terminal to the image forming apparatus where printing is performed.

It is common that a mobile terminal is provided with a rechargeable battery without including an AC power supply. Thus, it has been proposed a technology of reducing the buttery consumption caused by the occurrence of print processing standby by preferentially executing print processing of a mobile terminal.

SUMMARY

A mobile terminal of the present disclosure is a mobile terminal including a buttery residual quantity detecting part, a data conversion part, and remote control operation processing part.

A mobile terminal, powered by a battery, that is configured to transmit a color document composed of color data as color print data to an image forming apparatus, and to cause the image forming apparatus to execute printing of the color print data, the mobile terminal includes a battery residual quantity detecting part that is configured to detect a battery residual quantity of the battery; a data conversion part that is configured to convert the color print data into monochrome data to create monochrome print data; and a remote control operation processing part that is configured to cause the data conversion part to create monochrome print data by converting the color print data into the monochrome data when it is determined that transmission of the color print data cannot successfully be completed based on the battery residual quantity detected by the battery residual quantity detecting part and data volume of the color print data, and to transmit the created monochrome print data to the image forming apparatus.

A control method of the present disclosure is a control method of executing remote control processing of causing a mobile terminal, powered by a battery, to transmit a color document composed of color data as color print data to an image forming apparatus, and causing the image forming apparatus to print the color print data.

The control method detects a battery residual quantity of the battery.

The control method creates monochrome print data by converting the color print data into monochrome data as the remote control operation processing when it is determined that the transmission of the color print data cannot successfully be completed based on the detected battery residual quantity and the data volume of the color print data, and transmits the created monochrome data to the image forming apparatus.

BRIEF DESCRIPTION OF THE DRAWINGS

FIG. 5 is a view showing data reduction guidance displayed on an operation part of the mobile terminal shown in FIG. 2; and FIG. 6 is a flowchart showing a print data transmitting operation in a sequential mode of the mobile terminal shown in FIG. 2.

DETAILED DESCRIPTION

Figure 1:
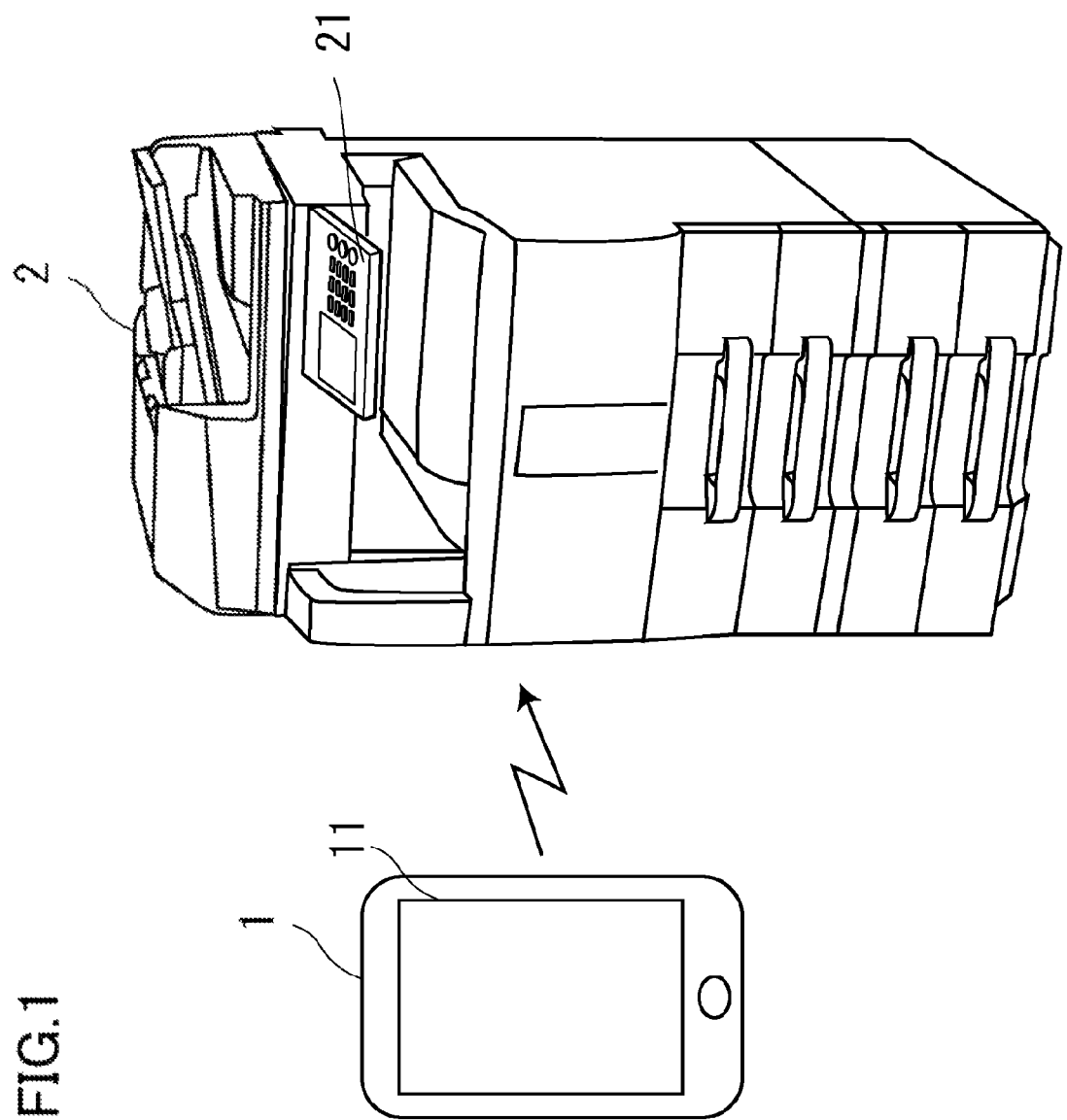
FIG. 1 is a system configuration diagram of an image forming system composing of a mobile terminal and an image forming apparatus according to an exemplary embodiment of the present disclosure.

Hereinafter, an exemplary embodiment of the present disclosure will be described with reference to the accompanying drawings. It is to be noted that in the following description of the exemplary embodiment like reference characters refer to like parts.

As shown in FIG. 1, an image forming system includes a mobile terminal 1 and an image forming apparatus 2 connected to the mobile terminal 1 via, for example, a wireless network. The image forming apparatus 2 is an apparatus, such as a printer, a copying machine and a MFP (Multifunction Peripheral/Printer/Product) having a printing function, and is configured to be operable from both the mobile terminal 1 and an operation panel 21.

Figure 2:
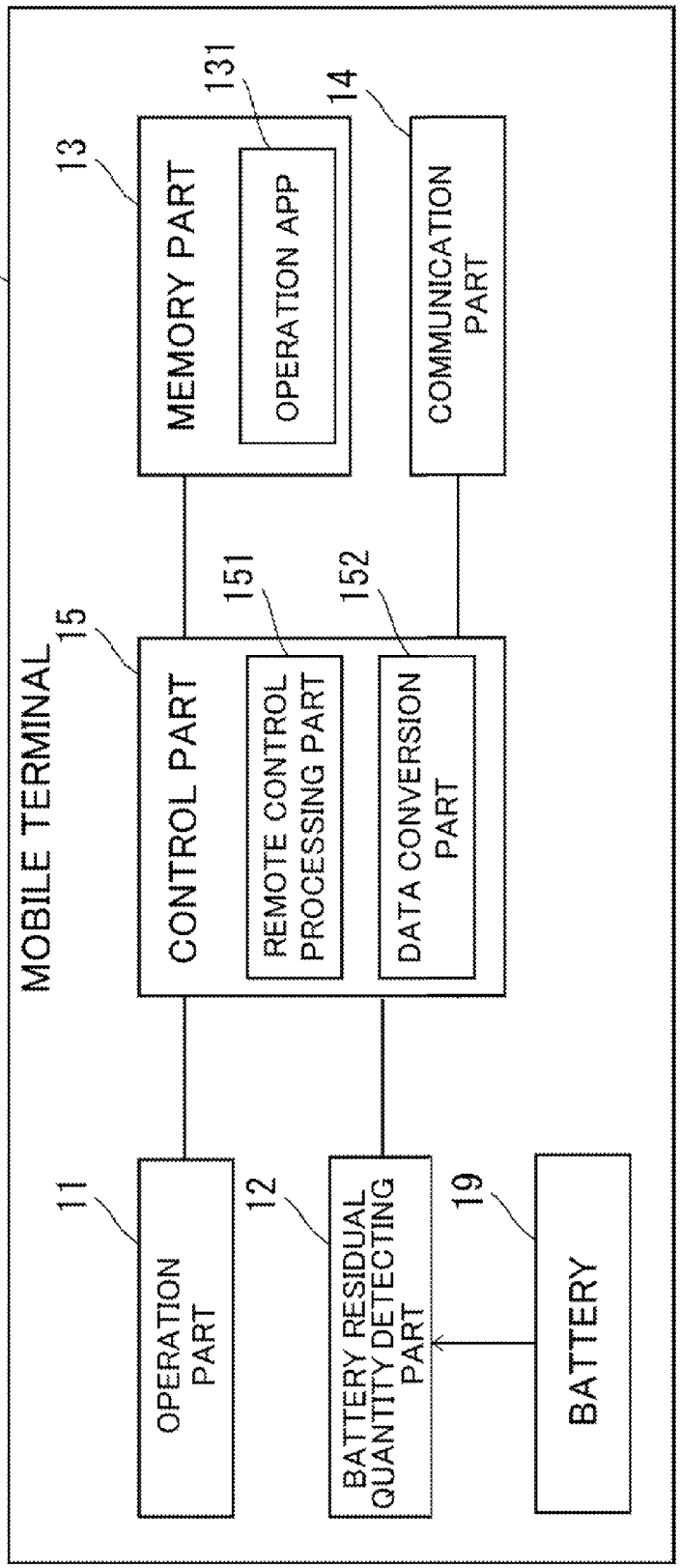
FIG. 2 is a block diagram showing a configuration of a mobile terminal shown in FIG. 1.

The mobile terminal 1 is a portable device, such as a cellular telephone, a smart phone, a tablet terminal and a PDA (personal Digital Assistant), which is powered by a battery 19. As shown in FIG. 2, the mobile terminal 1 includes an operation part 11, a battery residual quantity detecting part 12, a memory part 13, a communication part 14, and a control part 15.

The operation part 11 includes a display part displaying various information and various operation keys. The display part may be a touch panel functioning as a display means on a surface of a display panel of which a transparent pressure sensitive sensor is provided, and an input means.

The battery residual quantity detecting part 12 detects a battery residual quantity of the battery 19 of the mobile terminal 1 and notifies the detected battery residual quantity to the control part 15. Alternatively, a battery residual quantity of the battery 19 may be detected based on measured results of a voltage between terminals and an inner resistance of the battery 19 or measured results of currents flowing into and flowing out from the battery. In addition, a battery residual quantity of the battery 19 may be detected in an arbitrary unit including a percentage in which a fully charged state of the battery is set to 100%, electric energy [Wh] and so on. In the present exemplary embodiment, the battery residual quantity detecting part 12 detects the battery residual quantity of the battery 19 in terms of percentage.

The memory part 13 is a memory means, such as a semiconductor memory and a HDD (Hard Disk Drive) or the like. The memory part 13 stores various documents accumulated by a user and an operation APP 131. The operation APP 131 is an application program for remotely controlling the image forming apparatus 2, and is installed in the mobile terminal 1. A user can install the operation APP 131 in the mobile terminal 1 by downloading the APP 131 from the Internet or the like via the communication part 14.

The communication 14 has a function to transmit/receive various data to/from the image forming apparatus 2 via the wireless network.

The control part 15 is respectively connected to the operation part 11, the battery residual quantity detecting part 12, the memory part 13, and the communication part 14, and performs a control operation of the whole mobile terminal 1 in response to specific instruction information inputted from the operation part 11. The control part 15 is an information processing part, such as a microprocessor including a ROM (Read Only Memory) and a RAM (Random Access Memory) or the like. The ROM stores a control program to control an operation of the mobile terminal 1. The control part 15 reads the control program stored in the ROM and develops the read control program on the RAM to control the whole mobile terminal 1 in response to the specific instruction information inputted from the operation part 11.

In addition, when a starting operation of the operation APP 131 is executed via the operation part 11, the control part 15 evokes the operation APP 131 stored in the memory part 13 and develops the evoked operation APP 131 on the RAM to execute the operation APP 131. Thus, the control part 15 functions as a remote control processing part 151 and a data conversion part 152.

The remote control processing part 151 displays an operation screen on the operation part 11, designates a document to be printed, and receives a print executing instruction n for the designated document. Then, the remote control processing part 151 transmits the designated document, as print data, to the image forming apparatus 2 via the communication part 14.

The data conversion part 152 executes data conversion processing of converting a document composed of color data into gray scale monochrome data.

Figure 3:
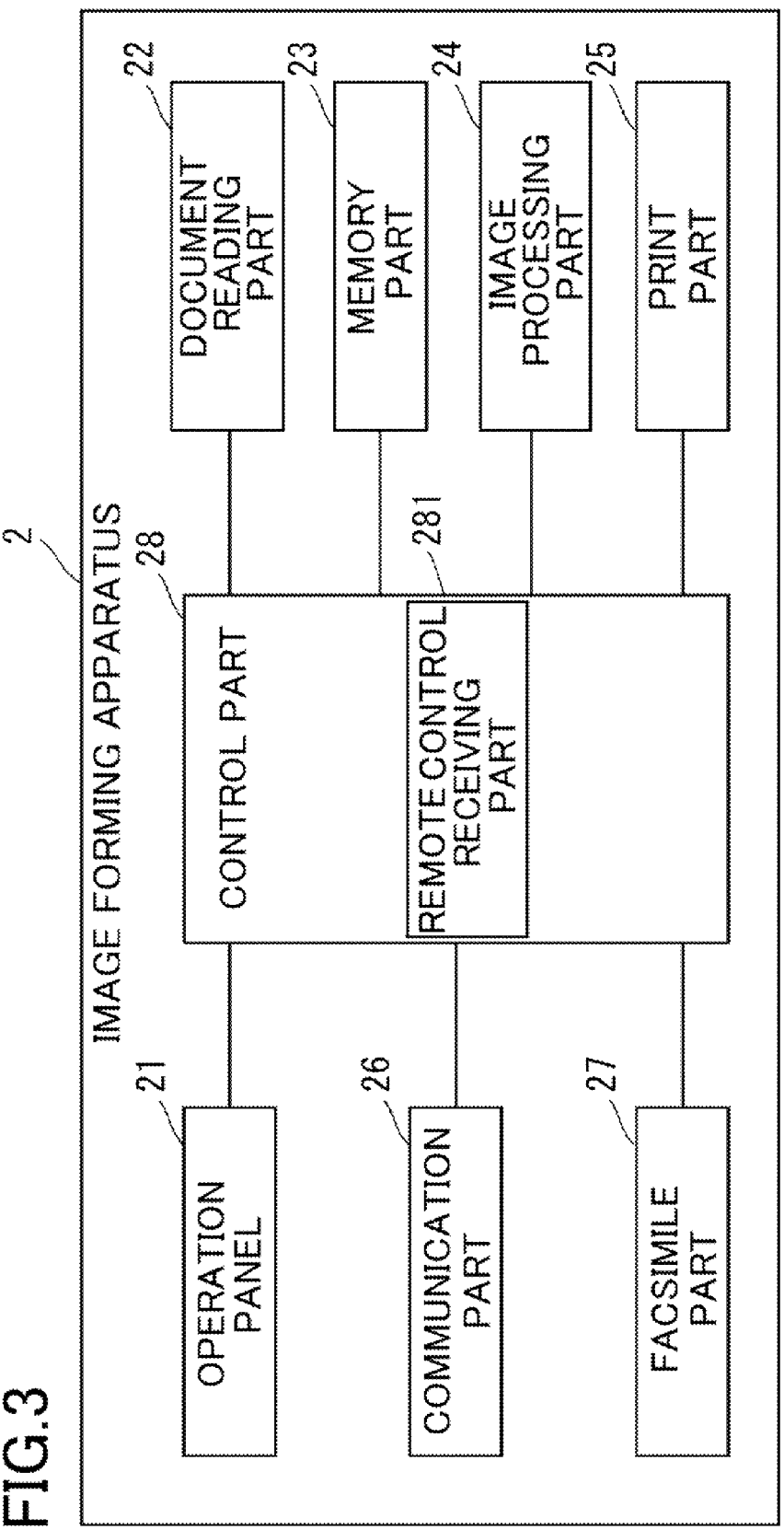
FIG. 3 is a block diagram showing a configuration of an image forming apparatus shown in FIG. 1.

Next, the image forming apparatus 2 will be described with reference to FIG. 3. The image forming apparatus 2 is an MFP (Multifunction Printer) and includes an operation panel 21, a document reading part 22, a memory part 23, an image processing part 24, a print part 25, a communication part 26, a facsimile part 27, and a control part 28.

The operation panel 21 includes a touch panel and an operation button. The touch panel is provided with a transparent pressure sensitive sensor on a surface of the display part that displays various operation keys and image forming status, and functions as a display means and an input means. The touch panel detects a touch operation to the display surface and outputs a signal corresponding to a position at which the touch operation is detected to thereby receive an operation to the operation keys displayed on the display part. In addition, the operation buttons have various operation keys, such as numeric keys for inputting a numeral value such as the number of copies, a reset key for inputting an instruction to initiate setting information, a stop key for stopping a copy operation, and a start key for inputting an output instruction to start a printing operation.

The document reading part 22 is a scanner emitting light to a document fed by a document feeding device or a document placed on a plantain glass by a user, and receives the reflected light to read a document image.

The memory part 23 is a memory means, such as a semiconductor memory or a HDD. The memory part 23 stores the image data read by the document reading part 22, and image data received by the communication part 26 and the facsimile part 27.

The image process part 24 is a means applying prescribed image processing to the image data. In the image processing part 24, image upgrading processing, such as zooming in and out processing, a density adjustment, and a gradation adjustment, or the like.

The print part 25 is a print means printing the image data stored in the memory part 23. The print part 25 forms an electrostatic latent image on a surface of a photosensitive drum based on the image data readout from the memory part 23, and makes image formation of a toner image from the electrostatic latent image using a toner. Then, the toner image thus formed is transferred from the photosensitive drum onto a recording paper, and the transferred recording paper is fixed on the recording paper, and finally discharged.

The communication part 26 has a function of transmitting/receiving various data to/from the mobile terminal 1 via the wireless network. Additionally, the communication part 26 may have a function of transmitting/receiving various data to/from the mobile terminal 1 via a LAN (Local Area Network) cable.

The facsimile part 27 has a modem and creates a facsimile signal from the image data read out by the document reading part 22, and from the image data stored in the memory part 23. The facsimile part 27 has a facsimile transmitting function of transmitting the created facsimile signal via a public network and a facsimile receiving function of receiving a facsimile signal via the public network.

The control part 28 is respectively connected to the operation panel 21, the document reading part 22, the memory part 23, the image processing part 24, the print part 25, the communication part 26, and the facsimile part 27. The control part 28 is an information processing part, such as a microprocessor including a ROM (Read Only Memory), a RAM (Random Access Memory) and the like. The ROM stores a control program for operation control of the image forming apparatus 2. The control part 28 reads the control program stored in the ROM and loads the read control program on the RAM to control the whole operation of the image forming apparatus 2. In addition, the control part 28 is configured to function as a remote control receiving part 281 when the print data is received from the mobile terminal 1 via the communication part 26 and to cause the print part 25 to print the received print data.

Figure 4:
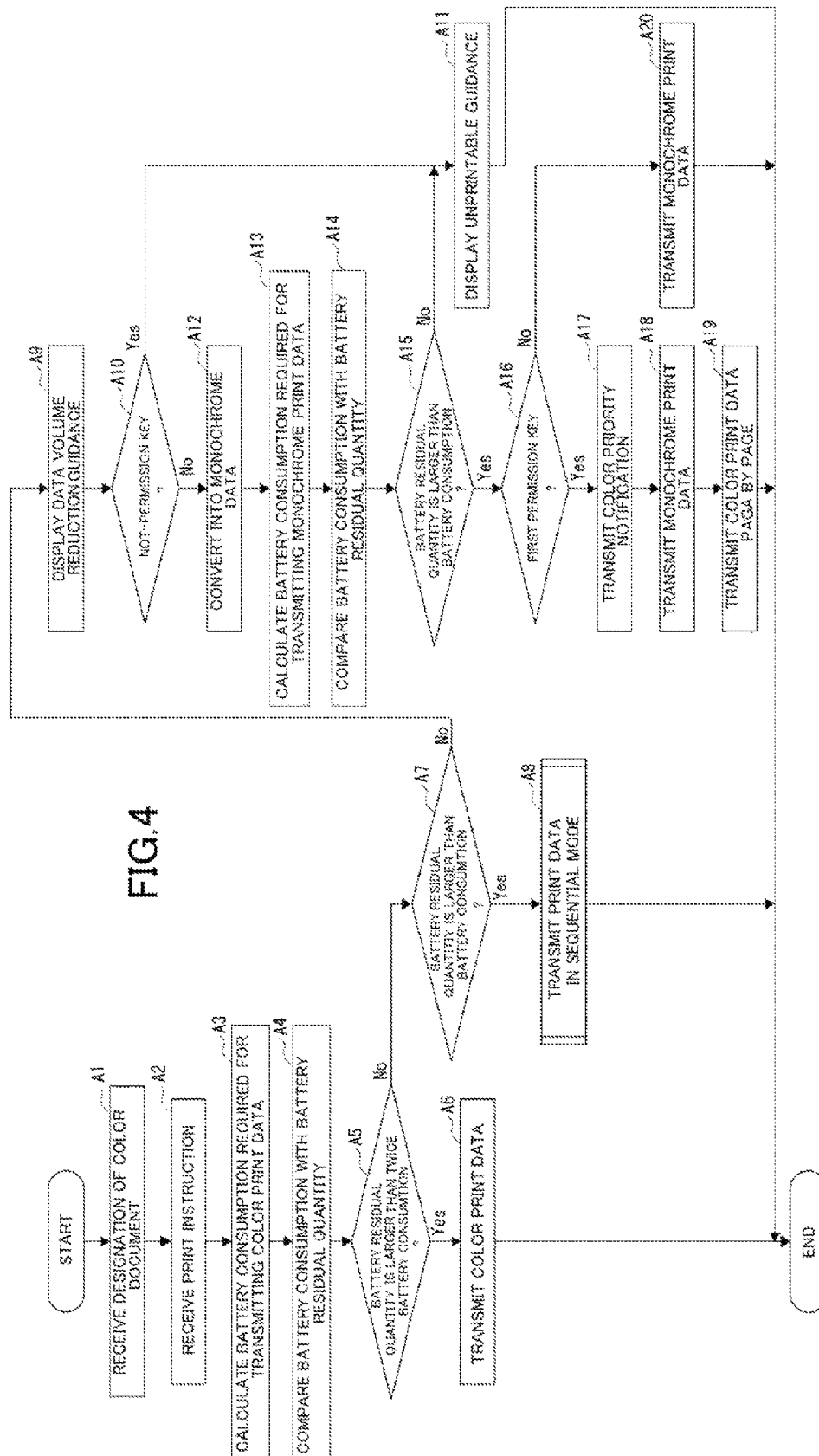
FIG. 4 is a flowchart showing a print data transmitting operation of the mobile terminal shown in FIG. 2.

Next, a print data transmitting operation in the image forming system of the present exemplary embodiment will be described in detail with reference to FIGS. 4 and 5.

First of all, in the mobile terminal 1, the remote control processing part 151 causes the operation part 11 to display a operation screen and receives designation of a document to be printed (Step A1). The following is an example wherein a document composed of color data is designated (hereinafter, referred to as a "color document").

When a printing instruction is received from the operation part 11 (Step A2), the remote control processing part 151 calculates a battery consumption of the battery 19 required for transmitting the designated color document as color print data (Step A3). The larger the print data, the longer a communication time, it follows that a battery consumption of the battery 19 will proportionately increase. The remote control processing part 151 presets a battery consumption Y % of the battery 19 per a unit print data volume: X bytes, and calculates a battery consumption of the battery 19 by multiplying the data volume of the color print data by (Y/X).

Then, the remote control processing part 151 compares the battery residual quantity of the battery 19 detected by the battery residual quantity detecting part 12 with the battery consumption of the battery 19 calculated in Step A3 (Step A4), and determines whether or not the battery residual quantity of the battery 19 is larger than or equal to twice the battery consumption of the battery 19 (Step A5). Then, if it is determined in step A5 that the battery residual quantity of the battery 19 is larger than or equal to twice the battery consumption of the battery 19, the remote control processing part 151 causes the communication part 14 to transmit the color print data to the image forming apparatus 3, and terminates the processing.

In step A5, a determination is made whether or not the battery residual quantity of the battery 19 is larger than or equal to a transmission criteria determined depending on the data volume of the color print data (that is, twice the battery consumption of the battery 19) that is, whether or not the battery residual quantity of the battery 19 can ensure completion of the successful transmission of the color print data without running out of the battery. Even though the battery residual quantity of the battery 19 is larger than or equal to the battery consumption of the battery 19, there is a possibility that battery exhaustion may occur during the transmission due to a detection error of the battery residual quantity of the battery 19 by the battery residual quantity detecting part 12s and an increased communication time caused by external factors, such as a communication state. In light of such a probable situation the battery residual quantity of the battery 19 is determined with plenty of time to spare in Step A5. It is to be noted that the coefficient to be multiplied by the buttery consumption of the battery 19 is not limited to 2, and therefore any value exceeding 1 may be available. Further, it may be allowed to add a specific value to the battery consumption of the battery 19.

In Step A6, the transmission of the color data is executed without having to fear of the battery exhaustion when the color print data is received from the mobile terminal 1 via the communication part 26. The control part 28 of the image forming apparatus 2 functions as the remote control receiving part 281. Then, when the reception of the color print data from the mobile terminal 1 is completed, the remote control receiving portion 281, causes the print part 25 to print the received color print data.

If it is determined in Step A5 that the battery residual quantity of the battery 19 is less than twice the battery consumption of the battery 19, the remote control processing part 151 determines whether or not the battery residual quantity of the battery 19 is larger than or equal to the battery consumption of the battery 19 (Step A7). If it is determined in Step A7 that the battery residual quantity of the battery 19 is larger than or equal to the battery consumption of the battery 19, the remote control processing part 151 transmits the color print data in a sequential mode to the image forming apparatus 2 (Step A8), and terminates the processing. The transmission of the color print data in the sequential mode will be described later.

In Step A7, a determination is made whether or not the transmission of the color print data can successfully be completed without running out of the battery by determining whether or equal not the battery residual quantity of the battery 19 is larger than or to a transmission impossible criteria (the battery consumption of the battery 19: transmission possible criteria>transmission impossible criteria). That is to say, it is natural that the transmission of the color print data should be completed successfully without running out of the battery so long as the battery residual quantity of the battery 19 is larger than or to the battery consumption of the battery 19. However, there is a possibility that the battery exhaustion may occur during the transmission due to a detection error of the battery residual quantity of the battery 19 by the battery residual quantity detecting part 12 and an increased communication time caused by external factors, such as a communication state.

If it is determined in Step A7 that the battery residual quantity of the battery 19 is less than the battery consumption of the battery 19, the remote control processing part 151 determines that the power sufficient to transmit the color print data is no longer left and causes the operation part 11 to display data volume reduction guidance (Step A9). As shown in FIG. 5, the data volume reduction guidance notifies that the power sufficient to transmit the print data is no longer left and displays a message 111 inquiring of a user whether or not the user changes the color print data into the monochrome data. In addition to this, there are provided a first permission key 112 for receiving permission to change to the monochrome data in a color priority mode, a second permission key 113 for receiving permission to change to the monochrome data in a monochrome printing mode, and a not-permission key 114 for not permitting to e change to the monochrome data. Thus, the user recognizes that the power sufficient to transmit the color print data is no longer left, and that it should address this emergency by selectively operating any one of the first permission key 112, the second permission key 113, and the not-permission key 114.

Next, the remote control processing part 151 determines whether or not the not-permission key 114 is operated (Step A10), causes the operation part 11 to display unprintable guidance notifying that printing of the designated color document cannot be executed with the current battery quantity (Step A11), if the not-permission key 114 is operated, and terminates the processing.

If either one of the first permission key 112 and the second permission key 113 is operated in Step A10 without operating the not-permission key 114, the data conversion part 152 converts the color print data into gray scale monochrome data (Step A12). Then, the remote control processing part 151 calculates a battery consumption of the battery 19 required for transmitting the converted monochrome print data (Step A13). As with Step A3, the remote control processing part 151 calculates the battery consumption of the battery 19 by multiplying the data volume of the monochrome print data by (Y/X).

Next, the remote control processing part 151 compares the battery residual quantity of the battery 19 detected by the battery residual quantity detecting part 12 with the battery consumption of the battery 19 calculated in Step A13 (Step A14) and determines whether or not the battery residual quantity is larger than or equal to the battery consumption of the battery 19 (Step A15). If it is determined in Step A15 that the battery residual quantity of the battery 19 is less than or equal to the battery consumption of the battery 19, the remote control processing part 151 causes the operation part 11 to display unprintable guidance notifying that a document cannot be printed with the current battery residual quantity even if the color document is converted into the monochrome print data (Step A11).

If it is determined in Step A15 that the battery residual quantity of the battery 19 is larger than or equal to the battery consumption of the battery 19, the remote control processing part 151 determines whether or not the first permission key 112 is operated (Step A16). If the first permission key 112 is operated in Step A16, the remote control processing part 151 transmits "color priority notification" notifying that the mobile terminal 1 is in the color priority mode to the image forming apparatus 2 (Step A17) via the communication part 14 and transmits the monochrome print data converted in Step A12 (Step A18) via the communication part 14. Furthermore, when the transmission of the monochrome print data is completed, the remote control processing part 151 transmits the color print data page by page, before being subject to conversion into the monochrome print data, to the image forming apparatus 2 so long as the battery residual quantity of the battery 19 allows (Step A19). Since it has determined in Step A7 that no power sufficient to transmit the color print data is left, the transmission will be ceased in Step A19 in the middle of the transmission due to the battery exhaustion without transmitting all the pages.

When the "color priority notification" is received from the mobile terminal 1 via the communication part 26, the control part 28 of the image forming apparatus 2 functions as a remote control processing part 281. The remote control processing part 281 recognizes that the mobile terminal 1 is in the color priority mode by receiving the "color priority notification". Thus, even if the reception of the monochrome print data from the mobile terminal 1 is completed, the remote control processing part 281 receives the subsequent color print data transmitted page by page without immediately starting printing. Then, when the reception of the color print data is ceased after a specified time interval elapses, the remote control processing part 281 prints in color a page including only the color print data and prints in monochrome a page including the monochrome print data.

If it is determined in Step A16 that the second permission key 113 is operated instead of the first permission 112, the remote control processing part 151 transmits the monochrome print data converted in Step A12 to the image forming apparatus 281 via the communication part 14 (Step A20), and terminates the processing.

The transmission of the monochrome print data in Step A20 is executed without having to fear the battery exhaustion. When the monochrome print data is received from the mobile terminal 1 via the communication part 26, the control part 28 of the image forming apparatus 2 functions as the remote control receiving part 281. Then, when the reception of the monochrome print data from the mobile terminal 1 is completed, the remote control receiving part 281 causes the print part 25 to print the received monochrome print data.

Next, a description is made in detail to a transmission operation in the sequential mode in Step A8 with reference to FIG. 6.

The remote control processing part 151 transmits one page color print data to the image forming apparatus 2 via the communication part 14 (Step B1), and determines whether or not the transmission of all the pages is completed (Step B2). If it is determined in Step B2 that the transmission of all the pages is completed, the remote control processing part 151 terminates the transmission operation of the print data in the sequential mode.

If it is determined in Step B2 that the transmission of all the pages is completed, the remote control processing part 151 calculates a battery consumption of the battery 19 required for transmitting the remaining color print data (Step B3). Next, the remote control processing part 151 compares the battery residual quantity of the battery 19 detected by the battery residual quantity detecting part 12 with the battery consumption of the battery 19 calculated in Step B3 (Step B4), and determines whether or not the battery residual quantity of the battery 19 is larger than or equal to the battery consumption of the battery 19 (Step B5). If it is determined in Step B5 that the battery residual quantity of the battery 19 is larger than or equal to the battery consumption of the battery 19, the remote control processing part 151 goes back to Step B1 and transmits next one page color print data to the image forming apparatus 2 via the communication part 14.

If it is determined is Step B5 that the battery residual quantity of the battery 19 is less than the battery consumption of the battery 19, the data conversion part 152 converts the remaining color print data into gray scale monochrome data and creates monochrome print data (Step B6). Then, the remote control processing part 151 transmits the "color priority notification" notifying that the mobile terminal 1 is in the color priority mode to the image forming apparatus 2 via the communication part 14 (Step B7), and transmits the monochrome print data converted in Step B6 via the communication part 14 (Step B8). Furthermore, when the transmission of the monochrome print data is completed in Step B8, the remote control processing part 151 transmits the remaining color print data page by page, before being subject to conversion into the monochrome data, to the image forming apparatus 2 so long as the battery residual quantity of the battery 19 allows (Step B9). Since it has determined in Step B5 that no power sufficient to transmit the remaining color print data the transmission will be ceased in Step B9 in the middle of the transmission due to the battery exhaustion without transmitting all the remaining color print data.

When the color print data is received from the mobile terminal 1 via the communication part 26, the control part 15 functions as the remote control receiving part 281. Then, when all the pages of the color print data are received from the mobile terminal 1, the remote control receiving part 281 causes the print part 25 to print all the received pages of the color print data. When the "color priority notification" is received page by page in the course of reception of the color print data page by page, the remote control receiving part 281 recognizes that the mobile terminal 1 is in the color priority mode.

Thus, even if the reception of the monochrome print data from the mobile terminal 1 is completed, the remote control processing part 281 receives the subsequent color print data transmitted page by page without immediately starting printing. Then, when the reception of the color print data is ceased, after a specified time interval elapses, the remote control receiving part 281 prints in color a page including the color print data and prints in monochrome a page including the monochrome data.

Alternatively, while the exemplary embodiment is configured to compare the battery consumption of the battery 19 with the battery residual quantity of the battery 19, another configuration may be taken in which a transmittable data volume is calculated based on the battery residual quantity of the battery 19, and the transmittable data volume is compared with the color print data. Still alternatively, another configuration may be taken in which the battery residual quantity of the battery 19 is compared with the color print data by converting them into a common third index.

Yet alternatively, while the aforementioned exemplary embodiment is configured to receive the permission to change to or the not-permission to change to the monochrome data is received according to the data volume reduction guidance, they may be registered preliminary. In addition, it is preferable to configure so that the permission to change or the not-permission to change to the monochrome data can be registered preliminary for every user or every kind of color document.

As described above, according to the present exemplary embodiment, the present embodiment provides a mobile terminal, powered by a battery, that is configured to transmit a color document composed of color data as color print data to an image forming apparatus, and to cause the image forming apparatus to execute printing of the color print data, the mobile terminal including a battery residual quantity detecting part that is configured to detect a battery residual quantity of the battery; a data conversion part that is configured to convert the color print data into monochrome data to create monochrome print data; and a remote control operation processing part that is configured to cause the data conversion part to create monochrome print data by converting the color print data into the monochrome data when it is determined that transmission of the color print data cannot successfully be completed based on the battery residual quantity detected by the battery residual quantity detecting part and data volume of the color print data, and to transmit the created monochrome print data to the image forming apparatus.

With this configuration, in a case where the transmission of the color print data cannot be transmitted due to the battery exhaustion, the monochrome print data with reduced data volume is transmitted. This reduces a risk of the battery exhaustion during the transmission of the print data.

This prevents a situation where printing is disabled without completing the transmission of all the print data when the battery of the mobile terminal 1 runs out during the transmission of the print data even if print processing of the mobile terminal 1 is preferentially executed.

Further, the present exemplary embodiment, the mobile terminal 1 includes an operation part 11 that is configured to display data volume reduction guidance for acceptance of permission to change to the monochrome data in the monochrome print mode if it is determined that the transmission of the color print data cannot successfully be completed. When the permission to change to the monochrome data in the monochrome print mode by the operation part 11, the remote control processing part 151 transmits color priority notification notifying that the mobile terminal 1 is in the color priority mode, and transmits the monochrome print data created by the data conversion part 152 to the image forming apparatus 2, and causes the image forming apparatus 2 to execute printing of the monochrome print data.

With this configuration, in a case where the user permits a change to the monochrome data in the monochrome print mode, it is possible to reduce a risk of the battery exhaustion during the transmission of the print data, thereby obtaining a monochrome printed matter permitted by the user.

Furthermore, the present exemplary embodiment includes an operation part 11 that is configured to display data volume reduction guidance for acceptance of permission to change to the monochrome data in the color priority mode if it is determined that the transmission of the color print data cannot successfully be completed. When the permission to change to the monochrome data in the color priority mode is received by the operation part 11, the remote control processing part 151 transmits color priority notification notifying that the mobile terminal 1 is in the color priority mode to the image forming apparatus 2, and transmits the monochrome print data created by the data conversion part 152 to the image forming apparatus 2. When the transmission of the monochrome print data is completed, the remote operation control part 151 transmits the color print data page by page, before being subject to conversion into the monochrome print data, to the image forming apparatus 2 and the image forming apparatus 2 prints in color a page including the color print data and prints in monochrome a page including the monochrome print data.

With this configuration, in a case where the user permits a change to the monochrome data in the color priority mode, it is possible to reduce a risk of the battery exhaustion during the transmission of the print data, thereby obtaining a printed matter composed with color as possible.

Moreover, in the present exemplary embodiment, the remote control processing part 151 determines whether or not the transmission of the color print data can successfully be completed during the transmission of the color print data based on the battery residual quantity and the data volume of the remaining color print data. If it is determined that the transmission of the color print data cannot successfully be completed, the remote control processing part 151 causes the data conversion part 152 to create monochrome print data by converting the color print data into the monochrome data, and transmits the created monochrome print data to the image forming apparatus 2.

With this configuration, it is possible to reduce a risk of the battery exhaustion during the transmission of the print data even when the power is largely consumed during the transmission of the color print data, and the battery residual quantity of the battery 19 decreases with that as a cause.

Still more, in the exemplary embodiment, the remote control processing part 151 determines whether or not the transmission of the color print data can successfully be completed during the transmission of the color print data. If it is determined that the transmission of the color print data cannot successfully be completed, the remote control processing part 151 transmits color priority notification notifying that the mobile terminal 1 is in the color priority mode to the image forming apparatus 2. When the transmission of the monochrome print data is completed, the remote control processing part 151 transmits the remaining color print data page by page to the image forming apparatus 2 and the image forming apparatus 2 prints in color a page including the color print data and prints in monochrome a page including the monochrome print data.

With this configuration, it is possible to reduce a risk of the battery exhaustion even when the power is largely consumed during the transmission of the color print data, and the battery residual quantity of the battery 19 decreases with that as a cause, thereby obtaining a printed matter composed of color as possible.

The present disclosure is not necessarily limited to the aforementioned each of the exemplary embodiments, and therefore it is quite obvious that each of the exemplary embodiments may be modified within the technical idea of the present disclosure. In addition, the number, positions, shapes of the aforementioned elements and so on are not limited to those mentioned in each of the exemplary embodiments, and therefore may be changed to suitable numbers, positions, and shapes in implementing the present disclosure.

What is claimed is:

1. A mobile terminal, powered by a battery, that is configured to transmit a color document composed of color data as color print data to an image forming apparatus, and to cause the image forming apparatus to execute printing of the color print data, the mobile terminal comprising:

a battery residual quantity detecting part that is configured to detect a battery residual quantity of the battery;

a data conversion part that is configured to convert the color print data into monochrome data to create monochrome print data; and a remote control operation processing part that is configured to cause the data conversion part to create monochrome print data by converting the color print data into the monochrome data when it is determined that transmission of the color print data cannot successfully be completed based on the battery residual quantity detected by the battery residual quantity detecting part and data volume of the color print data, and to transmit the created monochrome print data to the image forming apparatus.

2. The mobile terminal according to claim 1 further comprising an operation part that is configured to display data volume reduction guidance for acceptance of permission to change to the monochrome data in a monochrome print mode when it is determined that the transmission of the color print data cannot successfully be completed, wherein when the permission to change to the monochrome data in the monochrome print mode is received by the operation part, the remote control operation processing part transmits the monochrome print data created by the data conversion part to the image forming apparatus, and causes the image forming apparatus to execute printing of the monochrome print data.

3. The mobile terminal according to claim 1 further comprising an operation part that is configured to display data volume reduction guidance for acceptance of permission to change to the monochrome data in the color priority mode when it is determined that the transmission of the color print data cannot successfully be completed, wherein when permission to change to the monochrome data in the color priority mode is received by the operation part, the remote control processing part transmits color priority notification notifying that the mobile terminal is in the color priority mode to the image forming apparatus, transmits the monochrome print data created by the data conversion part to the image forming apparatus, and transmits the color print data page by page before being subjected to conversion into the monochrome data to the image forming apparatus after the transmission of the monochrome print data is completed, and wherein the remote control processing part prints in color a page including the color print data and prints in monochrome a page including the monochrome data.

4. The mobile communication terminal according to claim 1, wherein if the remote control processing part causes the data conversion part to convert the color print data into the monochrome data to create monochrome print data and transmits the created monochrome print data to the image forming apparatus when it is determined that the transmission of the color print data cannot successfully be completed based on the battery residual quantity and the data volume of the remaining color print data during the transmission of the color print data.

5. The mobile terminal according to claim 4, wherein the remote control processing part transmits color priority notification notifying that the mobile terminal is in the color priority mode to the image forming apparatus when it is determined that the transmission of the color print data cannot successfully be completed based on the battery residual quantity and the data volume of the remaining color print data during the transmission of the color print data, and transmits the remaining color print data page by page to the image forming apparatus after the transmission of the monochrome print data is completed, and wherein the remote control processing part causes the image forming apparatus to print in color a page including the color print data and print in monochrome a page including only the monochrome print data.

6. A control method of executing remote control processing of causing a mobile terminal, powered by a battery, to transmit a color document composed of color data as color print data to an image forming apparatus, and causing the image forming apparatus to print the color print data, the control method comprising the steps of:

detecting a battery residual quantity of the battery;

creating monochrome print data by converting the color print data into monochrome data as the remote control operation processing when it is determined that the transmission of the color print data cannot successfully be completed based on the detected battery residual quantity and the data volume of the color print data; and transmitting the created monochrome data to the image forming apparatus.

* * * * *